Figure 1:
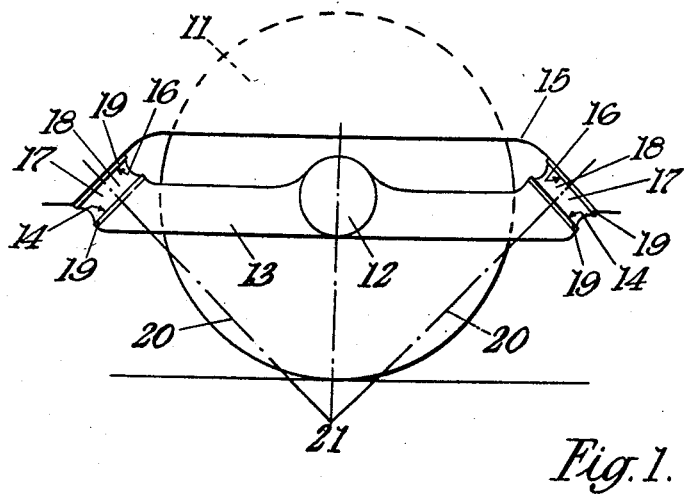

Feb. 19, 1957     A. J. HIRST     2,782,026
RESILIENT SUSPENSIONS FOR VEHICLE AXLE BOXES OR CASINGS
Filed Nov. 10, 1954

Inventor
Archie J. Hirst
By Ralph B. Stewart
attorney

# United States Patent Office 2,782,026
Patented Feb. 19, 1957

2,782,026

RESILIENT SUSPENSIONS FOR VEHICLE AXLE BOXES OR CASINGS

Archie John Hirst, Leicester, England, assignor to Metalastik Limited, Leicester, England, a corporation of Great Britain Application November 10, 1954, Serial No. 468,103

6 Claims. (Cl. 267—3)

This invention relates to resilient suspensions for vehicle axle-boxes or casings, and more particularly but not exclusively to those of road vehicles.

It is a known practice in the resilient mounting of road vehicle axles to utilise rubber blocks sandwiched between flat metal plates and adapted to take a load either in compression or in shear or both. The rubber block may be bonded to the metal plates and/or may be compressed between them. Thus British Patent No. 720,365 describes and claims an axle-box suspension mounting for a rail or like vehicle of a kind comprising compound resilient elements mounted fore and aft of the axle box. There the axes of maximum stiffness of the resilient elements in the plane normal to the wheel axis, are oppositely and upwardly inclined from the central horizontal plane of the axle-box.

Now in any vehicle having wheels which are not wholly free, i. e. wheels which either receive the driving torque or are capable of being braked, the accelerative force, that is to say either the traction force derived from the power unit and giving a positive acceleration or the braking force due to brake application and giving a negative acceleration, is a horizontal force at the point of contact between the road wheel and the road. Where, as is the case with most types of road vehicles, this accelerative force is resisted by a structure at a considerable height from the ground, then that accelerative force at ground level can be resolved into a force at the height of the said structure and a couple. Such is the case for example with the usual horizontal leaf spring. It is the above mentioned couple which gives rise to the familiar wind-up of the axle casing.

Whereas it is practicable with leaf springs to obtain an adequate resistance to this wind-up, that desideratum may be more difficult of attainment with rubber mountings; so that it is one of the objects of this invention so to design an axle-box suspension employing rubber blocks that the wind-up couple is reduced or even eliminated.

Now if any system of flexible mounting of a rigid body has a plane of symmetry, there is a point in that plane which has the following properties, namely (1) If a couple is applied to the rigid body about a direction perpendicular to the plane of symmetry of the body, then there will occur a rotation of the body about an axis through the plane and perpendicular to the plane; and (2) If a force is applied to the rigid body along a line in the plane of symmetry and passing through the said point, then there will occur a translation of the body without rotation.

That point is called the elastic centre or metacentre.

In accordance with one of the features of the present invention a resilient suspension for a vehicle axle box or casing employing rubber or like blocks fore and aft of the box or casing is so arranged that the metacentre of the system is at or close to ground level.

With such an arrangement the resistance to the accelerative force is itself a linear force substantially at the same level, so that the couple vanishes or becomes small.

Generally it is not practicable to bring the metacentre quite down to ground level; but the advantages of the invention are attained, though in less degrees, if the metacentre is anywhere below the level of the axle. A height above ground level of anything between ⅕ and ½ of the radius of the wheel will give satisfactory results.

Figure 2:
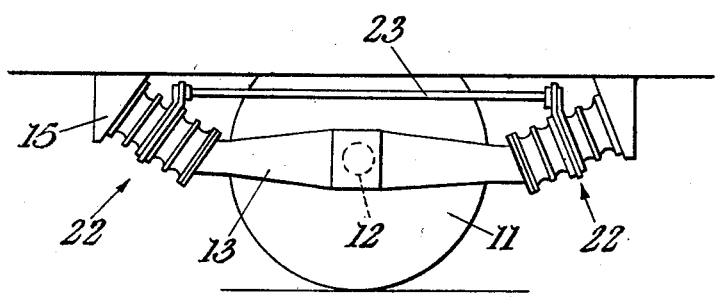

The following description relates to the accompanying drawing which shows by way of example only two embodiments of the invention. In the drawing:

Figure 1 shows by means of a side elevation a form of invention using simple sandwich units; and Figure 2 shows in like manner a form of the invention using multiple sandwich units with tied interleaves.

In Figure 1 of the drawing a road wheel 11 has its axle journalled in a known manner within an axle box or casing 12 which is in turn fixed centrally within an axle beam 13 extending in a longitudinal direction relatively to the axis of the vehicle, that is to say fore-and-aft of the vehicle. The axle beam 13 is of such a length that its extremities lie beyond the perimeter of the wheel 11.

At its extremities the beam 13 is formed with plane faces 14 which are inclined upwardly, that is to say the line of intersection of the two planes is situated well above the wheel axle. On the vehicle chassis 15 or on brackets fixed on the chassis, there are formed plane faces 16 which are parallel with and in juxtaposition to the faces 14 on the axle beam 13. Between the two faces 14 and 16 at each end there is fitted a rubber sandwich element 17, consisting of a slab 18 of rubber or the like material (the term rubber being used throughout this specification and in the claims to include like material, the most obvious of the like materials being the known artificial rubbers) flanked by metal plates 19 to which the rubber is bonded. Such a rubber sandwich element has a high ratio of compression stiffness to shear stiffness. The compression axes are indicated by the lines 20, and their point of intersection 21 is approximately the metacentre as above defined.

Figure 2, in which the same reference numerals are used for like parts, shows a slightly more complex system. Instead of simple rubber sandwiches, the resilient mounting elements 22 at the ends of the beam 13 are of a multiple type with a tie bar 23 between the interleaves 24 of the elements. This tie between interleaves is more particularly described in British patent specification No. 648,516.

It will be understood that the invention is not limited to the embodiments described with reference to the drawings. Thus the rubber mounting elements need not be of the bonded sandwich type; they may be for instance of the type described in previously mentioned Patent No. 720,365; or a pair of bonded or unbonded slab type mountings may be used being precompressed against one another; or any other construction may be used in which there is a high ratio of stiffness in two perpendicular directions, including a bush set with its shear axis inclined.

What I claim is:

1. A resilient suspension for a vehicle axle box comprising, in combination, an axle beam extending fore and aft of the axle box and having plane faces at the ends thereof facing upwardly and outwardly, means on the vehicle chassis providing two plane faces arranged parallel with and in juxtaposition to the plane faces on the ends of said beam, a block of resilient material interposed between the faces of each pair of faces, the inclination of the plane faces to the vertical plane containing the axis of the axle being such that the compression axes of said blocks of resilient material intersect at a point located below the axis of the axle a distance not less than one-half the radius of the wheels carried by said axle and not substantially greater than said radius.

2. A suspension according to claim 1 in which said blocks are located beyond the perimeter of the wheels carried by said axle.

3. A suspension according to claim 1 in which said resilient blocks are provided with metal interleaves, and including a tie-bar interconnecting said interleaves.

4. A suspension according to claim 1 and including flanking metal plates bonded to opposite faces of said resilient blocks.

5. A suspension according to claim 1 and including means for maintaining said resilient blocks under precompression.

6. A resilient suspension for a vehicle axle box comprising, in combination, an axle beam extending fore and aft of the axle box and having plane faces at the ends thereof facing upwardly and outwardly, means on the vehicle chassis providing two plane faces arranged parallel with and in juxtaposition to the plane faces on the ends of said beam, and resilient elements interposed between each pair of juxtaposed faces, the inclination of the plane faces to the vertical plane containing the axis of the axle being such that the compression axes of the resilient elements intersect at a point which is at a height above ground level of between one-fifth and a half of the radius of the wheels carried by said axle.

References Cited in the file of this patent
UNITED STATES PATENTS

| | | |
|---|---|---|
| 2,704,664 | Hickman | Mar. 22, 1955 |

FOREIGN PATENTS

| | | |
|---|---|---|
| 487,468 | Great Britain | June 21, 1938 |
| 648,516 | Great Britain | Dec. 2, 1949 |
| 763,264 | France | Feb. 5, 1934 |